United States Patent Office 3,850,939
Patented Nov. 26, 1974

3,850,939
5-NITRO-2-THIAZOLYLTHIOPYRIDINE, 1-OXIDES
Edward F. Elslager and Donald F. Worth, Ann Arbor, Mich., assignors to Parke, Davis & Company, Detroit, Mich.
No Drawing. Filed Feb. 20, 1973, Ser. No. 333,667
Int. Cl. C07d 31/50
U.S. Cl. 260—294.8 D
8 Claims

ABSTRACT OF THE DISCLOSURE 5 nitro-2-thiazolylthio-substituted heterocyclic compounds represented by the formula

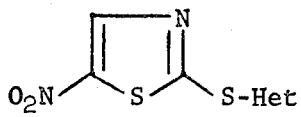

where Het represents 2-pyridyl, 1-oxide; 4-methyl-2-pyridyl, 1-oxide; 6-methyl-2-pyridyl, 1-oxide; 3-chloro-2-pyridyl, 1-oxide; 5-chloro-2-pyridyl, 1-oxide; 5-bromo-2-pyridyl, 1-oxide; 3,5-dichloro-2-pyridyl, 1-oxide; 1-methyl-5-tetrazolyl; or 1-phenyl-5-tetrazolyl; and their production by reacting 2-bromo-5-nitrothiazole with an appropriate heterocyclic mercaptan compound or an alkali metal salt thereof. The compounds are useful as chemotherapeutic agents having antifungal and antibacterial activity.

SUMMARY AND DETAILED DESCRIPTION

The present invention relates to new heterocyclic compounds that are useful as chemotherapeutic agents and to methods for their production. More particularly, the invention relates to new 5-nitro-2-thiazolylthio-substituted heterocyclic compounds that are represented by the formula

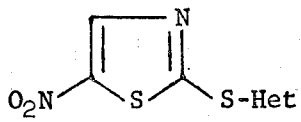

I where Het represents 2-pyridyl, 1-oxide; 4-methyl-2-pyridyl, 1-oxide; 6-methyl-2-pyridyl, 1-oxide; 3-chloro-2-pyridyl, 1-oxide; 5-chloro-2-pyridyl, 1-oxide; 5-bromo-2-pyridyl, 1-oxide; 3,5-dichloro-2-pyridyl, 1-oxide; 1-methyl-5-tetrazolyl; or 1-phenyl-5-tetrazolyl.

In accord with the invention, compounds having formula I above are produced by reacting 2-bromo-5-nitrothiazole, which has the formula,

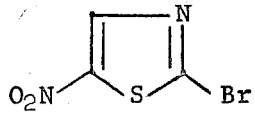

II with a heterocyclic mercaptan compound having the formula

Het—SH

III or an alkali metal salt thereof, where Het has the same meaning as given above. The reaction is best carried out in a non-reactive solvent medium. Suitable solvents include lower alkanols and lower aliphatic ketones. Preferred solvents are methanol and acetone. When it is desired to use an alkali metal salt of the mercaptan compound of formula III as one of the reactants, the salt is formed by adding a base, such as an alkali metal alkoxide, to the reaction mixture. Sodium methoxide is a preferred base for this purpose. The base also serves to neutralize the reaction product mixture. The temperature and duration of the reaction are not critical and may be varied, the temperature over the range from 10 to 75° C. and the duration from 10–15 minutes to 18–20 hours. It is most convenient to carry out the reaction at room temperature and at that temperature it is usually complete after 4–6 hours. Equivalent quantities of the reactants are normally employed although a small excess of either is not harmful. A large excess of base should be avoided.

The heterocyclic mercaptan compounds represented by formula III above that are used as starting materials in the foregoing process are prepared as described in detail hereinafter. For example, 5-chloro-2-mercaptopyridine, 1-oxide is obtained by first reacting 2,5-dichloropyridine with m-chloroperbenzoic acid to give 2,5-dichloropyridine, 1-oxide, and then reacting the 2,5-dichloropyridine, 1-oxide with hydrated sodium hydrogen sulfide.

The compounds of the invention are new chemical compounds that are useful as chemotherapeutic agents having antifungal and antibacterial activity. As antifungal agents, they are effective against pathogenic and non-pathogenic yeasts such as *Candida albicans* and human and animal filamentous fungal pathogens such as *Trichophyton mentagrophytes*. The antifungal activity of the compounds of the invention can be demonstrated and quantitatively determined in a test procedure carried out as follows.

A test compound is serially diluted in pure N,N-dimethylformamide to give concentrations of 20,000, 4000, 800, 160, and 32 micrograms ($\mu$g.)/ml. A further dilution of 1:100 is next made from each of these into duplicate tubes containing 9.4 ml. of Bacto-Sabouraud Dextrose Broth, resulting in two sets of broth tubes having final concentrations of 200, 40, 8, 1.6, and 0.32 $\mu$g./ml. of test compound in each set. One set of broth tubes is then inoculated with 0.5 ml. of a stock suspension of *Candida albicans*, containing from $2.0 \times 10^7$ to $6.0 \times 10^7$ viable units/ml. and the other set with 0.5 ml. of a stock solution of *Trichophyton mentagrophytes*, containing from $4 \times 10^5$ to $4 \times 10^7$ viable units/ml. Following inoculation, the tubes are incubated at 28° C. for 5–6 days and then read subjectively for evidence of growth or no growth.

The results obtained in the foregoing test method for the compounds of the invention are summarized in the following table, where the compounds are identified by reference to the examples that follow and the activity of each is expressed in terms of the minimum inhibitory concentration ("MIC"), that is, the lowest concentration that inhibits growth of the test organism.

ANTIFUNGAL ACTIVITY

| | MIC, $\mu$g./ml., against— | |
|---|---|---|
| Compound example No. | Candida albicans | Trichophyton mentagrophytes |
| 1 | 40 | 1.6 |
| 2(a) | 8 | 1.6 |
| 2(b) | 40 | 1.6 |
| 3(a) | 40 | 1.6 |
| 3(b) | 1.6 | 1.6 |
| 4 | 40 | 1.6 |
| 5 | 200 | 40 |
| 6(a) | 40 | 8 |
| 6(b) | 8 | 8 |

As antibacterial agents, the compounds of the invention exhibit activity *in vitro* against various gram negative and gram positive strains of bacteria, including one or more of the followings: *Streptococcus faecalis, Staphylococcus aureus, Pseudomonas aeruginosa, Escherichia coli, Shigella sonnei,* and *Mycobacterium tuberculosis.*

The compounds of the invention can be administered orally, parenterally, or topically. Topical administration is preferred for antifungal use. They can be combined with either a solid or liquid carrier or diluent and made available in vaying amounts in such pharmaceutical forms as ointments, creams, aerosol sprays, tablets, capsules, powders, and aqueous and non-aqueous suspensions and solutions.

The invention is illustrated by the following examples.

EXAMPLE 1

To a solution of 18.2 g. of the sodium salt of 1-hydroxy-2-(1H)-pyridinethione (hydrated form; 18% water) in 500 ml. of methanol at room temperature is added 20.9 g. of 2-bromo-5-nitrothiazole, and the resulting mixture is stirred at room temperature for 30 minutes to give an insoluble solid reaction product, which is isolated. It is 2-[(5-nitro-2-thiazolyl)thio]pyridine, 1-oxide, m.p. 146° C. (with decomposition), following crystallization from methanol.

EXAMPLE 2

(a) To a mixture consisting of 1.27 g. of 6-mercapto-2-picoline, 1-oxide, 0.49 g. of sodium methoxide, and 25 ml. of methanol is added 1.88 g. of 2-bromo-5-nitrothiazole, and the resulting mixture is stirred for one hour to give a solid precipitate of 6-[(5-nitro-2-thiazolyl)thio]-2-picoline, 1-oxide, which is isolated and purified by crystallization from methanol; m.p. 135° C. (with decomposition).

(b) Utilizing the procedure described in (a) above, with the substitution of 2-mercapto-4-picoline, 1-oxide for the 6-mercapto-2-picoline, 1-oxide, there is obtained 2-[(5-nitro-2-thiazolyl)thio]-4-picoline, 1-oxide; m.p. 134° C. (with decomposition), following crystallization from methanol.

EXAMPLE 3

(a) To a mixture consisting of 6.79 g. of 5-chloro-2-mercaptopyridine, 1-oxide, 2.27 g. of sodium methoxide, and 200 ml. of methanol is added 8.68 g. of 2-bromo-5-nitrothiazole, and the resulting mixture is stirred at room temperature for 15 minutes. Upon chilling, there is obtained from the mixture a solid precipitate of 5-chloro-2-[(5-nitro-2-thiazolyl)thio]pyridine, 1-oxide, which is isolated and purified by crystallization from acetonitrile; m.p. 138° C. (with decomposition).

(b) Utilizing the procedure described in (a) above, with the substitution of 5-bromo-2-mercaptopyridine, 1-oxide for the 5-chloro-2-mercaptopyridine, 1-oxide, there is obtained 5-bromo-2-[(5-nitro-2-thiazolyl)thio]pyridine, 1-oxide; m.p. 137° C. (with decomposition).

The 5-chloro-2-mercaptopyridine, 1-oxide used as a starting material in (a) above is prepared as follows.

A solution of 14.8 g. of 2,5-dichloropyridine in 400 ml. of chloroform is treated with activated charcoal and filtered. To a filtrate is added 23.7 g. of *m*-chloroperbenzoic acid and the resulting solution is kept at room temperature for 5 days. It is then washed with four 400-ml. portions of 10% aqueous sodium carbonate and with 100 ml. of saturated aqueous sodium chloride, dried, and evaporated to dryness to give a solid residue of 2,5-dichloropyridine, 1-oxide; m.p. 75–83° C., following several crystallizations from benzene-cyclohexane.

A mixture consisting of 8.20 g. of 2,5-dichloropyridine, 1-oxide, 10 g. of hydrated sodium hydrogen sulfide, and 120 ml. of 2-methoxyethanol is heated under reflux for one hour and concentrated. The residue is dissolved in water and the solution is filtered. The filtrate is acidified with concentrated hydrochloric acid and the solid precipitate of 5-chloro-2-mercaptopyridine, 1-oxide that is obtained is isolated, washed with cold water, and dried; m.p. 129–135° C., following crystallization from 2-propanol.

EXAMPLE 4

Utilizing the procedure described in Example 3(a) above, with the substitution of 3-chloro-2-mercapto-pyridine, 1-oxide for the 5-chloro-2-mercaptopyridine, 1-oxide, there is obtained 3-chloro-2-[(5-nitro-2-thiazolyl)thio]pyridine, 1-oxide; m.p. 120° C. (with decomposition), following crystallization from 2-propanol.

The 3-chloro-2-mercaptopyridine, 1-oxide starting material is prepared as follows.

A mixture consisting of 14.8 g. of 2,3-dichloropyridine, 23.7 g. of *m*-chloroperbenzoic acid, and 400 ml. of chloroform is kept at room temperature for 2 days and filtered. The filtrate is washed with four 200-ml. portions of 10% aqueous sodium carbonate and with 100 ml. of water. It is then extracted with eight 100-ml. portions of 20% hydrochloric acid, and the combined hydrochloric acid extracts are concentrated to a small volume. The residue is mixed well with 80 ml. of 10% aqueous sodium carbonate, and the mixture is extracted with four 80-ml. portions of chloroform. The combined chloroform extracts are then dried and evaporated to dryness to give a solid residue of 2,3-dichloropyridine, 1-oxide, suitable for use without further purification.

A mixture consisting of 5.0 g. of 2,3-dichloropyridine, 1-oxide, 3.1 g. of hydrated sodium hydrogen sulfide, and 50 ml. of water is heated on a steam bath for 2 hours, cooled, and filtered. The filtrate is acidified with concentrated hydrochloric acid, and the resulting solid precipitate is isolated and dried. It is then mixed well with 1 N sodium hydroxide, the mixture is filtered, and the filtrate is acidified with concentrated hydrochloric acid to give again a solid precipitate which is the desired 3-chloro-2-mercaptopyrdine, 1-oxide starting material; m.p. 102–106° C., following crystallization from 2-propanol.

EXAMPLE 5

To a mixture consisting of 0.196 g. of 3,5-dichloro-2-mercaptopyridine, 1-oxide, 0.054 g. of sodium methoxide, and 15 ml. of methanol is added 0.209 g. of 2-bromo-5-nitrothiazole, and the resulting mixture is stirred at room temperature for one hour to give an insoluble solid reaction product, which is isolated. It is 3,5-dichloro-2-[(5-nitro-2-thiazolyl)thio]pyridine, 1-oxide, m.p. 121° C. (with decomposition), following crystallization from 2-propanol.

The 3,5-dichloro-2-mercaptopyridine, 1-oxide starting material is prepared as follows.

A mixture consisting of 11.3 g. of 2-bromo-3,5-dichloropyridine, 11.8 g. of *m*-chloroperbenzoic acid, and 200 ml. of chloroform is kept at room temperature for 8 days. It is then washed with 200 ml. of 10% aqueous sodium carbonate and with 100 ml. of saturated aqueous sodium chloride and dried. The dried solution is poured onto a column prepared from 600 g. of alumina, and the column is eluted with forty portions (100–150 ml. each) of chloroform. The first fractions are discarded, and the intermediate fractions (19–31) are combined and evaporated to give 2-bromo-3,5-dichloropyridine, 1-oxide; m.p. 115–116° C.

A mixture consisting of 2.48 g. of 2-bromo-3,5-dichloropyridine, 1-oxide, 2 g. of hydrated sodium hydrogen sulfide, and 25 ml. of 2-methoxyethanol is heated under reflux for 90 minutes and concentrated. The residue is dissolved in water, and the aqueous solution is filtered. The filtrate is acidified with concentrated hydrochloric acid, and the solid precipitate of 3,5-dichloro-2-mercaptopyridine, 1-oxide that is obtained is isolated and dried; m.p. 104–107° C., following crystallization from 2-propanol.

EXAMPLE 6

(a) To a solution of 2.09 g. of 2-bromo-5-nitrothiazole in 30 ml. of acetone is added 2.00 g. of 1-phenyl-1H-tetrazole-5-thiol, sodium salt, and the resulting mixture is stirred at room temperature for 2 hours. It is then diluted with 10 ml. of methanol, and the solid precipitate of 5 - [(5-nitro-2-thiazolyl)thio]-1-phenyl-1H-tetrazole that is obtained is isolated and purified by crystallization from methanol; m.p. 129–131° C.

(b) Utilizing the procedure described in (a) above, with the substitution of 1-methyl-1H-tetrazole-5-thiol, sodium salt for the 1-phenyl-1H-tetrazole-5-thiol, sodium salt, there is obtained 1-methyl-5-[(5-nitro-2-thiazolyl)thio]-1H-tetrazole; m.p. 134–135° C., following crystallization from acetonitrile-methanol.

What is claimed is:

1. 5 - nitro - 2 - thiazolylthio-substituted heterocyclic compounds that are represented by the formula

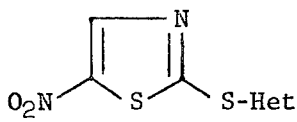

where Het represents a member of the class consisting of 2-pyridyl, 1-oxide; 4-methyl-2-pyridyl, 1-oxide; 6-methyl-2-pyridyl, 1-oxide; 3-chloro-2-pyridyl, 1-oxide; 5-chloro-2-pyridyl, 1-oxide; 5-bromo-2-pyridyl, 1-oxide and 3,5-dichloro-2-pyridyl, 1-oxide.

2. A compound according to Claim 1 which is 2-[(5-nitro-2-thiazolyl)thio]pyridine, 1-oxide.
3. A compound according to Claim 1 which is 6-[(5-nitro-2-thiazolyl)thio]-2-picoline, 1-oxide.
4. A compound according to Claim 1 which is 2-[(5-nitro-2-thiazolyl)thio]-4-picoline, 1-oxide.
5. A compound according to Claim 1 which is 5-chloro-2-[(5-nitro-2-thiazolyl)thio]pyridine, 1-oxide.
6. A compound according to Claim 1 which is 5-bromo-2-[(5-nitro-2-thiazolyl)thio]pyridine, 1-oxide.
7. A compound according to Claim 1 which is 3-chloro-2-[(5-nitro-2-thiazolyl)thio]pyridine, 1-oxide.
8. A compound according to Claim 1 which is 3,5-dichloro - 2 - [(5 - nitro - 2 - thiazolyl)thio]pyridine, 1-oxide.

References Cited
UNITED STATES PATENTS 2,744,908  5/1956  Young _____ 260—302
3,258,464  6/1966  Sasse et al. _____ 260—294.8 D ALAN L. ROTMAN, Primary Examiner U.S. Cl. X.R.

260—302 H; 424—263, 270